United States Patent [19]

Mourou

[11] 4,329,686
[45] May 11, 1982

[54] METHODS AND APPARATUS FOR GENERATING MICROWAVE PULSES AND FOR THE MEASUREMENT AND CONTROL THEREOF

[75] Inventor: Gerard Mourou, Rochester, N.Y.

[73] Assignee: The University of Rochester, Rochester, N.Y.

[21] Appl. No.: 160,691

[22] Filed: Jun. 18, 1980

[51] Int. Cl.$^3$ ............................................. G01S 13/86
[52] U.S. Cl. ................................... 343/6 R; 324/95; 333/258; 343/17.1 R; 357/30
[58] Field of Search ................... 343/6 R, 17.1 R; 324/95; 333/258; 357/30

[56] References Cited

U.S. PATENT DOCUMENTS

| | | | |
|---|---|---|---|
| 3,088,113 | 4/1963 | Rosenthal | 343/17.1 R |
| 3,917,943 | 11/1975 | Auston | 357/30 X |
| 4,218,618 | 8/1980 | Mourou | 357/30 X |

OTHER PUBLICATIONS

Joseph M. Proud et al.; High Frequency Waveform Generation Using Optoelectronic Swithing in Silicon; IEEE Trans. on Microwave Theory & Technology; vol. MTT 26, No. 3, Mar. 1978, pp. 137-140.

*Primary Examiner*—T. H. Tubbesing
*Attorney, Agent, or Firm*—Martin LuKacher

[57] ABSTRACT

Picosecond duration microwave pulses are generated used a laser activated semiconductor switch. High voltages are switched with picosecond rise time and result in the establishment of microwave pulses of frequency spectrum commensurate with the rise time of the voltage and wave guide parameters of a wave guide in which the switch is disposed. The activating light pulse is synchronous with the microwave pulse. A system, including an antenna and radar receiver, is responsive to the light pulse and return signals from a target on which the microwave pulse is incident. Reflection measurements of the microwave pulses from a body of semiconductor material which is optically excited by the light pulses relatively delayed between the generation of successive microwave pulses, indicate the duration of the microwave pulses.

21 Claims, 6 Drawing Figures

METHODS AND APPARATUS FOR GENERATING MICROWAVE PULSES AND FOR THE MEASUREMENT AND CONTROL THEREOF

DESCRIPTION

The present invention relates to methods and apparatus for generating microwave pulses and for the measurement and control thereof, and particularly to a microwave pulse generator which is optically activated and generates microwave pulses in synchronism with activating light pulses.

The invention is especially suitable for use in the generation of microwave pulses having picosecond duration, the microwave signals being in the centimeter and millimeter wavelength range, in response to laser light pulses and synchronously therewith. The invention also provides improved radar systems as well as means for measurement of the duration of ultra-short microwave pulses such as may be of durations in the picosecond range and which cannot be measured with accuracy by conventional detectors. By a microwave pulse is meant a burst of microwave energy.

Although many means are available for the generation of microwave pulses, the problem remains to generate ultra-short microwave pulses having high power in a simple and efficient manner. By ultra-short microwave pulses is meant pulses in the picosecond and sub-picosecond range. The corresponding microwave wavelengths are in the centimeter and millimeter range. By high power is meant that each pulse will be in the megawatt or gigawatt range. Another problem in the generation of ultra-short microwave pulses is timing, so that the time of occurrence of the microwave pulse is accurately indicated.

The simplicity, efficiency and timing problems in the generation of high power, ultra-short microwave pulses are resolved in accordance with the invention through the use of optically activated solid state switching of high voltage in the multi-kilovolt range. By injecting a high voltage pulse, having an ultra-short rise time, into a structure such as a wave guide which supports the transmission of microwave energy, through the use of a photoconductive solid state switch, triggered by a laser light pulse, ultra-short microwave pulses are generated. The microwave pulse is synchronized with picosecond timing accuracy to the optical pulse. Since the microwave pulse is derived from a high voltage, ultra-short electrical transition, the pulse power is very high.

Laser active photoconductive switches of the type which may be used in accordance with the present invention are described in U.S. Patent Application Ser. No. 13642 now U.S. Pat. No. 4,218,618 filed Feb. 21, 1979 in the name of Gerard Mourou which is entitled "Apparatus for Switching High Voltage Pulses with Picosecond Accuracy." Such switches may also be of the type described in U.S. Patent Application Ser. No. 96711 filed Nov. 21, 1979 in the name of Gerard Mourow and entitled "Light Activated Solid State Switch" (see also Mourow and Knox, *Appl. Phys. Lett.* 35, 492 (1979) and Mourow and Knox, *Appl. Phys. Lett.* 36, 623 (1980)). Although solid state light activated switches have been used for switching microwave signals, their use for the generation of high power ultra-short microwave pulses has not been previously proposed (see Auston, U.S. Pat. No. 3,917,943; Johnson and Auston, IEEE J. Quant. Elect., Vol. QE 11, 283 (1975); DeFonzo, Lee and Mak, *Appl. Phy. Lett.* 35, 575 (1979); Auston, *Appl. Phys. Lett.* 26, 101 (1975); and Lee *Appl. Phys. Lett.* 30, 84 (1977)).

A radar system may make use of the microwave generator as by connecting it through a circulator to an antenna. The radar receiver or other processing means is responsive to the return pulse from the circulator as well as the timing pulse derived from the activating light pulse. Range and other radar signals obtained by processing the timing signal and the return signal may be displayed.

The measurement of ultra-short microwave pulses with an accuracy commensurate with the duration thereof is also obtained in accordance with the invention through the use of the change in reflectivity of a charge carrier plasma in a semiconductive body, which plasma is activated by the activating light pulse. The change in reflectivity is sensed by the microwave pulse as it is reflected from the semiconductor in which the plasma is produced. This change in reflectivity, as a function of the time delay between the microwave pulse and the optical activating pulse which produces the plasma in the reflecting semiconductor, indicates the duration of the microwave pulse. Similarly, such change in reflectivity can control the transmission of microwave energy with precision timing accuracy.

Accordingly, it is the principal object of the invention to provide an improved method and apparatus for generating microwave pulses which may be ultra-short and of high power.

It is a further object of the present invention to provide an improved method and apparatus which is optically activated to generate microwave pulses.

It is a still further object of the present invention to provide an improved method and apparatus using a light activated solid state switch to generate microwave pulses.

It is a still further object of the invention to provide an improved method and apparatus for generating microwave pulses which are synchronized with optical pulses from a laser with picosecond accuracy.

It is a still further object of the present invention to provide an improved method and apparatus for generating microwave pulses in the picosecond duration range which provides centimeter and millimeter wavelength microwave energy together with timing pulses synchronous with the microwave pulses to picosecond accuracy for radar purposes.

It is a still further object of the present invention to provide improved apparatus for measuring the duration of microwave pulses of ultra-short duration through the use of charge carrier plasma effects in a semiconductor.

It is a still further object of the invention to provide improved apparatus for controlling the transmission of microwaves with precision timing accuracy through the use of an optically activated charge carrier plasma in a semiconductor.

Briefly described, high power microwave pulses are generated in accordance with the invention by illuminating a body of semiconductor material with a light pulse having a duration in the picosecond range to switch a voltage in the kilovolt range with a rise time in the picosecond range. Microwaves are generated in ultra-short pulses by translating the switched voltage into microwave energy. The microwave pulses so produced have a duration in the picosecond range which is synchronous with the light pulse.

The foregoing and other objects, features and advantages of the invention, as well as presently preferred embodiments of and the best mode of practicing the invention, will become more apparent from a reading of the following description in connection with the accompanying in which.

Figure 5:
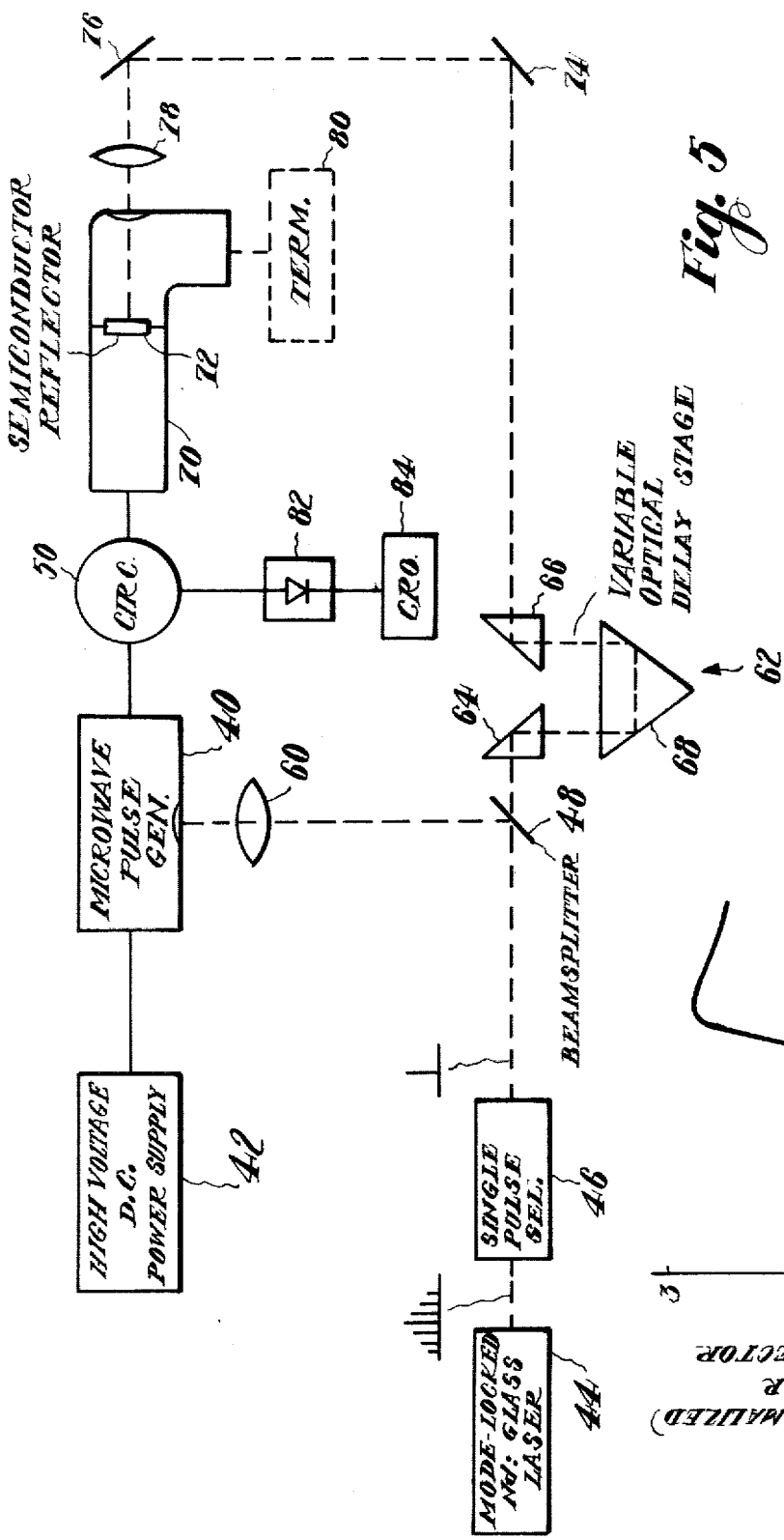
Figure 6:
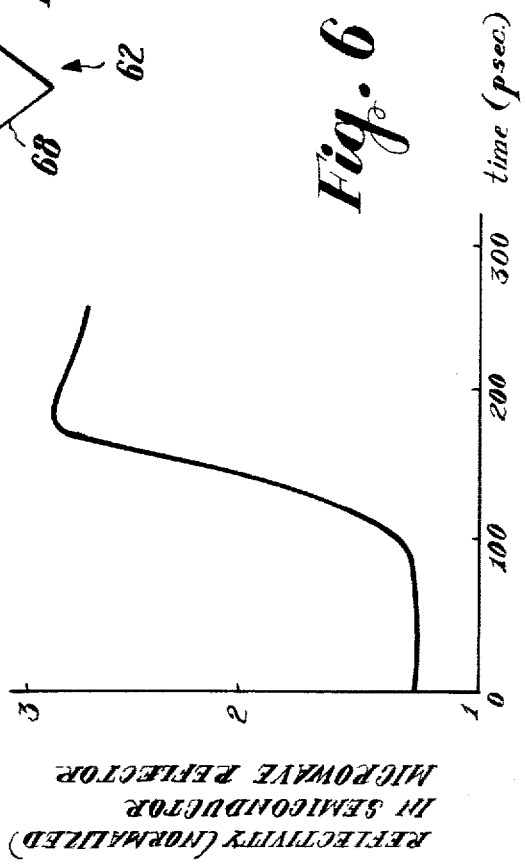

FIG. 5 is a block diagram of a system for measuring and controlling the transmission of ultra-short microwave pulses in accordance with the invention; and FIG. 6 is a curve illustrating the variation in reflectivity as sensed by the microwave pulses reflected from the semiconductor reflector in the system shown in FIG. 5 with respect to variations in the time delay between occurrence of the microwave pulses and the optical pulses which activate the semiconductor reflector.

Figure 1:
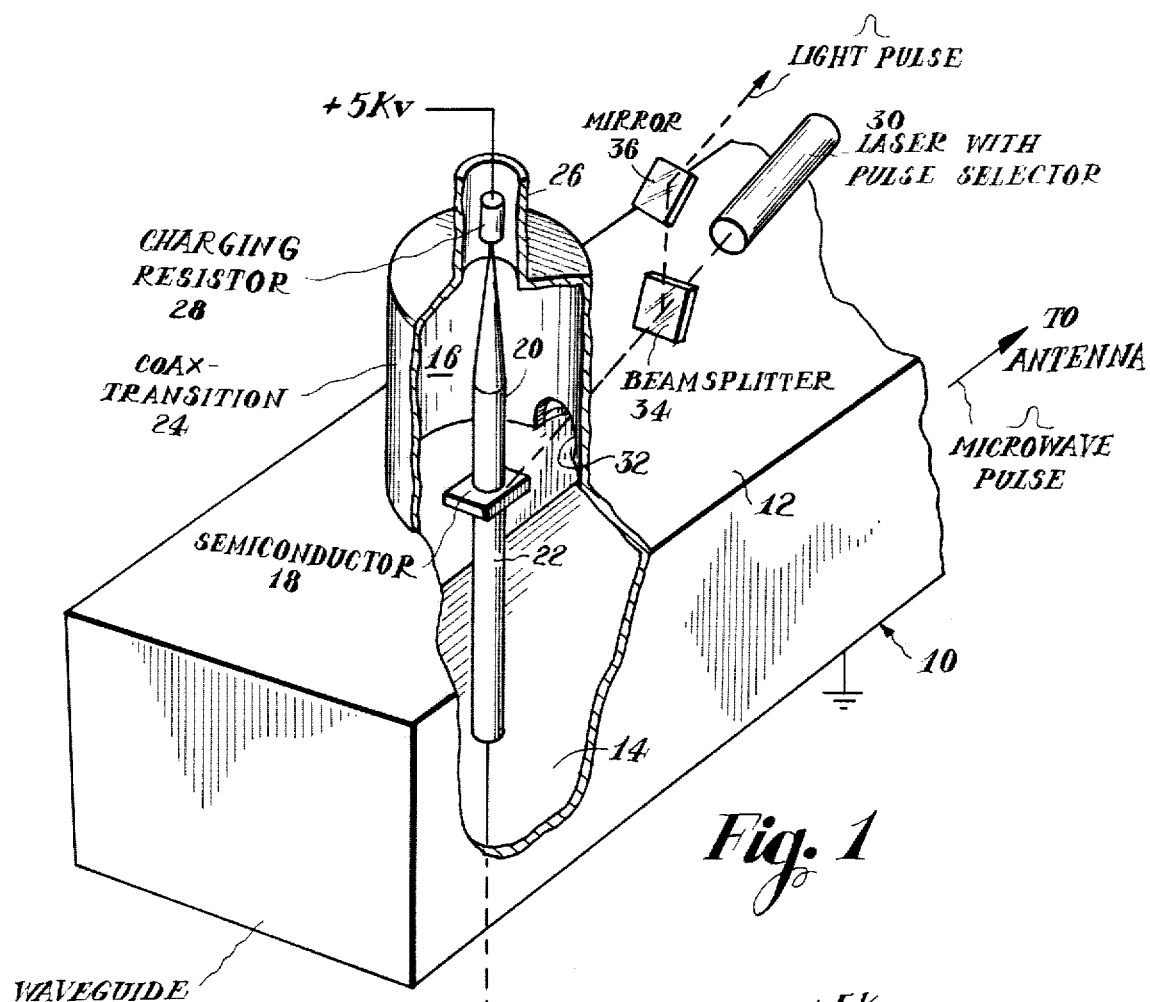
FIG. 1 is a perspective view of a microwave generator embodying the invention, the view being broken away to show the internal construction thereof.

Referring first to FIG. 1, there is shown a wave guide 10 having top and bottom walls 12 and 14. This wave guide provides a cavity for supporting the transmission of microwaves at a frequency corresponding to the rise time of the voltage switched by a laser light activated switch 16. The switch is constituted of a body 18 of semiconductor material. This body may be a rectangular wafer, as shown, or disc. The semiconductor material of the body, which is presently preferred, is chromium (Cr) doped gallium arsenide (GaAs). Other semiconductor materials may be used; e.g., silicon, germanium and indium phosphate as described in the above referenced patent applications and in the publications by Mourou and Knox. The semiconductor body may be about a centimeter long, a few millimeters wide and a few hundred microns thick; the thickness being between the opposing ends of the rods 20 and 22.

The rods 20 and 22 extend between the walls 12 and 14 of the wave guide 10 with the upper rod extending within a coaxial transition 24 which leads into a coaxial line 26. The rods 20 and 22 and the coaxial transition 24 are coaxial with each other. A charging resistor 28 in the coaxial line is connected to the upper end of the rod 20. This upper end may be tapered so as to provide the smooth transition in the voltage pulse which is generated upon switching. A charge line is provided by the coaxial line 26 and by the transition 24. The charge line is connected to a high voltage source as may be provided by a high voltage DC power supply. A multi-kilovolt source. e.g., a source providing five kilovolts DC as illustrated, is suitable when microwave pulses in the megawatt range are desired. The lower end of the rod 22 is connected to the wall 14 of the wave guide which may be grounded. In the event that the impedance presented to the lower end of the rod 22 does not match the impedance of the charge line; the end of the rod 22 may be returned to ground by way of a termination which may be a resistor which provides the matching impedance.

A laser, such as Nd:glass mode locked laser with a pulse selector 30, provides the activating light pulse. This pulse may, for example, be a 30 picosecond pulse of about 1.06 microns in wavelength which results in a charge carrier plasma in the semiconductor body 18 when it is incident thereon. The light pulse passes through an opening 32 in the wave guide and in the transition.

Figure 3:
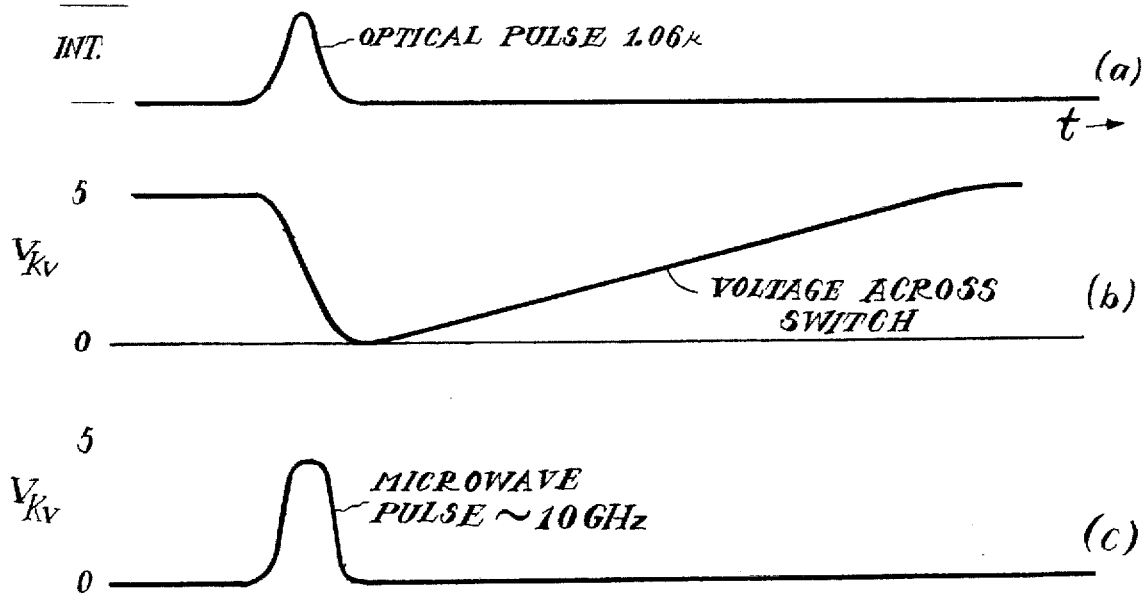
FIG. 3 are waveforms of the optical pulse, the voltage across the semiconductor switch and the microwave pulse produced with microwave generators of the type shown in FIGS. 1 and 2.

A beam splitter 34 reflects a portion of the activating light pulse to a mirror 36. This light pulse is synchronous with the transmission of the microwave pulse as will be observed in FIG. 3. The waveform of the optical pulse is shown in waveform (a) FIG. 3. The intensity of this pulse may be sufficient to provide optical energy in the micro-joule range. The duration of the pulse is, by way of example, 30 picoseconds full width half maximum (FHWM). This pulse triggers photoconduction in the semiconductor body 18 and results in a transition at the leading edge of the voltage switched by the switch commensurate in duration with the optical pulse. The voltage across the switch and the transition therein, from approximately five kilovolts to approximately ground potential, is shown in waveform (b) of FIG. 3. This picosecond rise time voltage pulse results in the generation of a microwave pulse of corresponding duration in the cavity formed by the wave guide 10. The microwave pulse is illustrated in waveform (c) of FIG. 3 and has a duration also of 30 to 50 picoseconds. The frequency of the microwave pulse is, therefore, approximately ten gigahertz (GHz). This pulse is of high power due to its short duration and high voltage. The pulse illustrated in waveform (c) of FIG. 3 has a power in the megawatt range.

Figure 2:
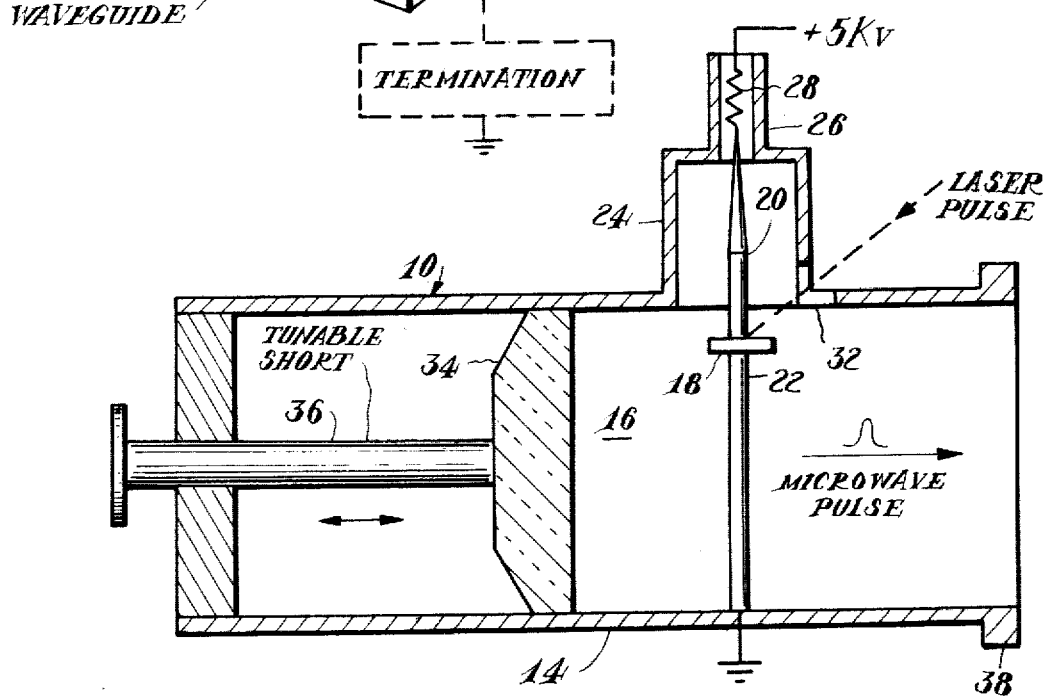
FIG. 2 is a sectional front view of a microwave generator of the type shown in FIG. 1 having means for tuning so as to support microwave pulses of different wavelengths.

The wave guide transmits the pulse to a utilization device such as an antenna. In order to change the duration of the microwave pulse, the laser pulse duration is changed; this may be accomplished with Q switching techniques or through the use of other short pulse lasers, the Nd: glass laser being illustrative. In order to change the frequency of microwave energy which the wave guide 10 supports, a tunable short 34, as illustrated in FIG. 2, may be used. This short 34 is a plate which is movable longitudinally along the wave guide by means of a plunger assembly 36. Other wave guides may be connected to the flange 38 of the wave guide 10 for transmission of the pulse to the utilization device.

Figure 4:
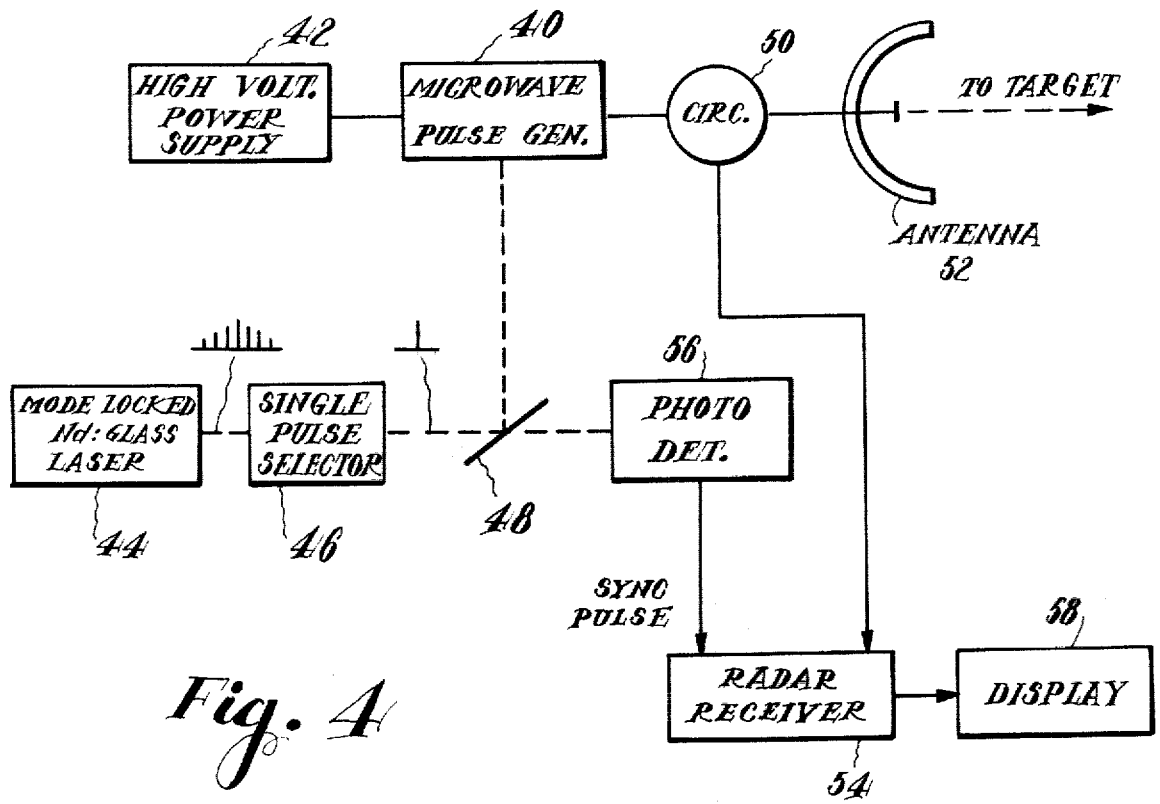
FIG. 4 is a block diagram of a radar system embodying the invention.

Referring to FIG. 4, there is shown a radar system using a microwave pulse generator 40, similar to the generator shown in FIGS. 1 and 2. A high voltage power supply, such as a multi-kilovolt DC supply 42, drives the generator. A mode locked Nd:glass laser 44 produces a train of light pulses, one of which is selected by a single pulse selector 46. The activating light pulse from the single pulse selector is deflected by a beam splitter 48 to the semiconductor material body in the microwave generator 40. Upon occurrence of each light pulse, a microwave pulse and a light pulse, synchronous with picosecond precision therewith, are produced. The mode locked laser may be pumped successively to produce successive light pulses which result in the generation of successive microwave pulses.

The light pulses are fed through a circulator 50 to an antenna 52 which scans the target area. Return signals from the target are picked up by the antenna and transmitted through the circulator to a radar receiver or other signal processing means 54. A photodetector 56 translates the light pulses into sync pulses and applies them to the receiver 54. The sync pulse provides information as to the time of transmission of the microwave pulse, such that range and other data may be obtained from the sync pulse and the return signal from the target by the radar receiver 54. This information is inputted to a display 58 which may display range or other echo ranging information.

Referring to FIG. 5, there is shown a system for measurement of the duration of the microwave pulse. The microwave pulse generator, together with its laser and single pulse selector, may be the same as used in the radar system of FIG. 4 and like parts of both systems are given like reference numerals. It will be observed that a lens 60 between the beam splitter 48 and the opening in the wave guide of the microwave pulse generator 40 may be provided to focus the laser light on the body of semiconductor material 18 near the gap between the rod electrodes 20 and 22 which is filled by the body of semiconductor material 18 (see also FIG. 1). The output pulse from the beam splitter is applied through a variable delay stage 62 consisting of stationary prisms 64 and 66 and a movable prism 68 so as to provide light pulses which are selectively variably delayed with respect to the microwave pulses produced by the pulse generator 40. The microwave pulses and the activating light pulses, which are applied to the generator 40, occur simultaneously with picosecond accuracy as explained above. The microwave pulse generator, which is of the same type as the generator shown in FIGS. 1 and 2, is used as the source of microwave pulses, the duration of which is to be measured. Other microwave pulse generators may also be used. It is necessary, however, that the generation of the pulses therein have the same time relationship with the laser light pulses consistently from pulse to pulse.

The microwave pulses are transmitted through the circulator 50 and into a wave guide 70 in which a wafer 72 of semiconductor material is disposed. The semiconductor material, in a presently preferred embodiment of the invention, is intrinsic germanium. The wafer 72 may be approximately 50 micrometers thick. The microwave pulse is incident on a surface of the wafer 72 which defines the thickness thereof. The opposite surface has incident thereon, the light pulse which is originally from the laser 44. This light pulse is variably delayed and has a progressively shorter or progressively longer delay between successive pulses. When the light pulse reaches the semiconductor wafer 72, after passing through the beam splitter 48 the delay stage 62, mirrors 74 and 76 and a lens 78, a charge carrier plasma is formed in the semiconductor. This charge carrier plasma is sometimes called an electron hole (e-h) plasma. The semiconductor wafer 72 then becomes a microwave reflector. Instead of traveling down the wave guide 70 to a termination 80, the microwave pulses are reflected back to the circulator; the reflected pulses are detected in a microwave diode detector 82 and displayed on a Cathode ray oscilloscope (CRO) 84.

The amplitude of the reflected pulses, as measured by their height on the CRO 84, represents the reflectivity of the semiconductor 72. The reflected signal is greater as it comes into closer time coincidence with the light pulse which produces the plasma in the semiconductor microwave reflector 72. In other words, the change in reflectivity is a function of the time delay between the optical and microwave pulses reaching the semiconductor 72. The variable delay stage can easily provide a delay of about 60 picoseconds/centimeter of movement of the prism 68. By measuring the reflected pulse energy on the CRO for light pulses of successively greater delay with respect to the microwave pulses, a curve such as shown in FIG. 6 is obtained. Since the carrier life time in the semiconductive material of the reflector 72 is longer than the optical pulse, the detector 82 output signal represents the time integral of the reflected microwave pulse. In effect, the curve represents the convolution of the microwave pulse amplitude and the reflectivity of the semiconducor material as represented by the optical pulse amplitudes. For microwave pulses of essentially Gaussian shape, the time difference between minimum and maximum reflectivity (as measured by the amplitude of the reflected microwave pulses which are of a relatively low and relatively high amplitude), indicates the duration of the microwave pulse by being approximately 1.6 times the FWHM of the microwave pulse. The curve shown in FIG. 6 indicates that the microwave pulse duration is approximately 50 picoseconds FWHM. Although the measurement is indirect, it indicates the duration of ultra-short microwave pulses.

Consider also that the termination 80 is an antenna or other microwave ultilization device. Preferably, the semiconductor reflector 72 is closely adjacent to such a device. The reflector 72 is optically activated with precision timing with respect to the microwave pulses and controls the transmission thereof. Such control may be used for shaping and amplitude or power control of the microwave energy.

From the foregoing description, it will be apparent that there has been provided improved methods and apparatus for microwave pulse generation which may be implemented at low cost and which is efficient in operation. The availability of a precisely timed optical pulse makes possible the application of microwave pulse generation according to the invention in radar systems and other applications where precise timing between microwave pulse and pulses indicating the occurrence thereof are needed. The invention also provides a means for measuring ultra-short duration pulses through the use of optical energy coincident with the generation of the microwave pulses, the duration of which is to be measured. Variations and modifications in the herein described methods and apparatus, within the scope of the invention, will undoubtedly suggest themselves to those skilled in the art. Accordingly, the foregoing description should be taken as illustrated and not in a limiting sense.

What is claimed is:

1. The method of generating a high power microwave pulse which comprises the steps of illuminating a body of semiconductor material with a light pulse having a duration in the picosecond range to switch a voltage in the kilovoltage range with a rise time in the picosecond range, supporting said semiconductor body in a waveguide, and translating said switching voltage into a microwave pulse having a duration in the picosecond range which is synchronous with said light pulse.

2. The method as set forth in claim 1 wherein said translating step further comprises tuning said wave guide to support radiation at a wavelength corresponding to the rise time of said switched voltage.

3. The method of generating a high power microwave pulse which comprises the steps of illuminating a body of semiconductor material with a light pulse having a duration in the picosecond range to switch a voltage in the kilovoltage range with a rise time in the picosecond range, splitting said light pulse into first and second parts to produce said light pulse for illuminating said semiconductor body and another light pulse which is synchronous therewith, and translating said switching voltage into a microwave pulse having a duration in the picosecond range which is synchronous with said first-named light pulse and said other light pulse.

4. The method of generating high power microwave pulses which comprises the steps of applying a train of light pulses which successively illuminate a body of semiconductor material with light pulses each having a duration in the picosecond range to switch a voltage in the kilovoltage range with a rise time in the picosecond range, and translating said switching voltage into microwave pulses each having a duration in the picosecond range and each of which is synchronous with a different one of said light pulses thereby causing a train of microwave pulses to be generated.

5. Apparatus for generating a high power, picosecond duration, microwave pulse which comprises a body of semiconductor material, a wave guide in which said body is supported, and means for transmitting a high voltage through said body with a picosecond duration rise time which comprises means for applying a voltage in the kilovolt range to said body, and means for illuminating said body with a light pulse of picosecond duration to cause photoconduction therein.

6. The apparatus as set forth in claim 5 wherein said wave guide is of dimensions which support microwave transmission therein at a wavelength corresponding to the duration of said light pulse.

7. The apparatus as set forth in claim 6 wherein said body is a wafer of said semiconductor material, rods having opposed ends sandwiching said wafer therebetween, said rods being disposed within said wave guide between opposite walls thereof, and an opening in said wave guide for the transmission of said light pulse along a path incident on said wafer.

8. The apparatus as set forth in claim 7 wherein said wave guide has a coaxial transition, said rods being coaxial with said transition, one of said rods extending into said transition, and a coaxial line having a charging resistor in said line and connected to the end of said one rod opposite to the end thereof which sandwiches said wafer.

9. The apparatus as set forth in claim 5 further comprising means for splitting a portion of said light pulse to obtain a second light pulse synchronous with said first-named light pulse.

10. The apparatus as set forth in claim 5 wherein said illuminating means is a laser.

11. The apparatus as set forth in claim 10 wherein said laser is a mode locked laser, and a pulse selector at the output of said laser for selecting single pulses of light for application to said body of semiconductor material.

12. The apparatus as set forth in claim 10 wherein said laser produces light pulses of about 1.06 microns wavelength and said semiconductor material is GaAs doped with Cr.

13. The apparatus as set forth in claim 5 wherein said voltage applying means includes a multikilovolt D.C. supply, and a charge line for applying said voltage in pulses upon photoconduction in said body.

14. The apparatus as set forth in claim 5 further comprising means for tuning said wave guide to support microwave energy at a wavelength corresponding to the risetime of said high voltage.

15. Radar apparatus which comprises a light activated microwave pulse generator having a body of semiconductor material, a source of high voltage connected to said body, laser means for applying light pulses to said body to cause switching of said high voltage therein, and means for supporting and transmitting microwave pulses generated when said high voltage is switched in said body, means for splitting said light pulses to provide optical pulse synchronous with said microwave pulses, an antenna, means for applying said microwave pulses from said transmitting means to said antenna and obtaining return signals received by said antenna from a target, and processing means responsive to said synchronous light pulses and said return signals.

16. The invention as set forth in claim 15 wherein said processing means is a radar receiver with a display, and means for translating said synchronous light pulses into electrical pulses for processing in said receiver with said return signals.

17. Apparatus for measuring the duration of microwave pulses which comprises means for generating optical pulses synchronous with said microwave pulses, a body of semiconductor material upon which said pulses are evident, means for applying said optical pulses to said body to photoproduce a plasma of charge carriers therein, and means for detecting said microwave pulses upon reflection from said body.

18. Apparatus as set forth in claim 17 further comprising means for applying said optical pulses to said body with different delays, and means for indicating the duration of said microwave pulses as a function time delay between different ones of said optical pulses at which relatively low and relatively high amplitude reflected microwave pulses are detected.

19. Apparatus as set forth in claim 18 wherein said semiconductor material is intrinsic germanium, and a laser which generates said optical pulses at about 1.06 microns wavelength.

20. Apparatus for controlling the transmission of microwave energy which comprises waveguide means through which said energy propagates, a body of semiconductor material in said waveguide, means for applying optical pulses in predetermined time relationship to said body to photoproduce a plasma of charge carriers therein so as to selectively reflect said microwave energy with precision timing accuracy.

21. The invention as set forth in claim 20 further comprising means operated by said optical pulses for generating microwave pulses with precision timing accuracy with the application of said optical pulses to said body.

* * * * *